United States Patent

Strassmann

Patent Number: 6,127,009
Date of Patent: Oct. 3, 2000

[54] DISPENSER UNIT, PROCESS FOR MANUFACTURING THE SAME AND ITS USE

[75] Inventor: Günther Strassmann, Bielefeld, Germany

[73] Assignee: Pactiv Corporation

[21] Appl. No.: 09/185,471

[22] Filed: Nov. 3, 1998

Related U.S. Application Data

[63] Continuation-in-part of application No. PCT/DE97/00837, Apr. 25, 1997.

[30] Foreign Application Priority Data

May 8, 1996 [DE] Germany ............ 296 08 344 U

[51] Int. Cl.[7] ............ B65D 30/08; B65D 35/10; B29C 47/00
[52] U.S. Cl. ............ 428/35.2; 428/35.4; 428/36.91; 428/217; 383/26; 383/28; 383/109; 383/114; 383/116; 383/906; 222/92; 222/104; 604/403; 604/408; 156/244.13; 156/244.17; 156/244.24
[58] Field of Search ............ 428/35.2, 35.4, 428/36.91, 217; 604/403, 408, 415; 383/105.26, 109.28, 110, 113, 14, 116, 906; 222/92, 95, 107; 156/244.1, 244.17, 244.24, 244.13

[56] References Cited

U.S. PATENT DOCUMENTS

| | | | |
|---|---|---|---|
| 4,516,977 | 5/1985 | Herbert | 604/415 |
| 4,561,110 | 12/1985 | Herbert | 604/408 |
| 4,650,452 | 3/1987 | Jeusen | 604/408 |
| 4,892,604 | 1/1990 | Measells et al. | 156/244.24 |
| 5,066,290 | 11/1991 | Measells et al. | 604/408 |
| 5,630,530 | 5/1997 | Geier et al. | 222/95 |

FOREIGN PATENT DOCUMENTS

| | | |
|---|---|---|
| 380 270 | 8/1990 | European Pat. Off. . |
| 232171 | 11/1992 | European Pat. Off. . |
| 564231 | 10/1993 | European Pat. Off. . |
| 3200264 | 7/1983 | Germany . |
| 3247294 | 7/1983 | Germany . |
| 3305365 | 9/1984 | Germany . |
| 4427175 | 2/1996 | Germany . |
| 19640038 | 9/1997 | Germany . |
| WO 82/04016 | 11/1982 | WIPO . |
| WO 93/23108 | 11/1993 | WIPO . |

*Primary Examiner*—Rena L. Dye
*Attorney, Agent, or Firm*—Jenkens & Gilchrist

[57] ABSTRACT

A dispenser unit has a flexible polymer bag, a joining part (10, 11) and a stiff hard part (20). The joining part has an inner layer (11) welded to the hard part and an outer polymer layer (10) welded to the inner material of the flexible bag. The inner material (30) of the flexible bag and the outer material of the joining part (10) are the same and are joined in such a way that they may be thermally sterilized. A process for manufacturing this dispenser unit has a step of coextrusion of the multilayered bag material, a step of extrusion of the multilayered joining part, and steps for sealing the bag material, sealing the multilayered joining part and sealing the hard part. The dispenser unit can be used for dispensing liquids, in particular aqueous liquids for human or animal medicine or in the food industry.

17 Claims, 1 Drawing Sheet

DISPENSER UNIT, PROCESS FOR MANUFACTURING THE SAME AND ITS USE

CROSS REFERENCE TO RELATED APPLICATION

This application is a continuation-in-part application of International Application No. PCT/DE97/00837, filed Apr. 25, 1997, the entire contents of which are hereby incorporated by reference herein.

BACKGROUND INFORMATION

1. Field of the Invention

The invention relates to a dispenser unit having a flexible polymer bag, a joining part, and an inflexible hard part, wherein the joining part has an inner layer, welded to the hard part, and an outer polymer layer, welded to the inner material of the flexible bag, processes for manufacturing it, and its use.

2. Background Information

Such dispenser units are used for storing and dispensing liquids and in particular are physiologically safe heat-sterilizable bags which are manufactured from transparent polymers, such as polyolefin materials, and have at least one hard part, which is sterilizably joined to the bag material via a joining piece; that is, the welded connection between the bag and the hard part easily withstands (steam) sterilization temperatures of at least 121° C. The bag should be transparent so that any changes in the liquids contained in it, such as sedimentation, clouding, etc., are immediately apparent. Such bags are used for instance in medicine as blood bags, bags for dialysis liquids, plasma, etc., but are also optionally suitable for other aqueous solutions, such as beverages, and so forth.

Thousands of similar flexible containers are in use and in the prior art are primarily made from soft PVC. PVC is favorable because it can be readily bonded tightly to polycarbonate, which is the usual material for hard parts, and also forms a transparent, flexible film. However, PVC has meanwhile become undesirable for various reasons. PVC, if it is to be able to offer the physical properties of flexibility that are demanded, must contain plasticizers. These plasticizers, such as diisooctylphthalate, have a tendency to migrate out of the PVC and into the liquid contained in the bag. Thus, over the time such PVC bags are used, a long-term dialysis-dependent patient might absorb several grams of plasticizer, which is extremely objectionable physiologically and can cause permanent damage to the patient. Aside from this, PVC is problematic to dispose of, because of the occurrence of chlorine compounds when it is combusted, and attempts have therefore already been made to replace it with nonhalogenated compounds. Thus far, however, it has been highly problematic to achieve the favorable properties of PVC, namely the very good, problem-free weldability and transparency with high liquid tightness and good water vapor barrier properties, with other materials at commercially feasible expense.

For instance, it is known from German Patent Disclosure DE 32 47 294 A1 for bags of a polyolefin, such as polyethylene, to be welded to a hard part, made for instance of polycarbonate, by means of a tubular joining piece that is a polyethylene copolymerized with vinyl acetate, and subsequently to cross-link this composite by radiation, thus making the connection between the PE of the bag and the PE of the joining part sterilization-proof. In the non-cross-linked state, the polyethylene copolymerized with vinyl acetate begins to flow at sterilization temperatures; it is thus necessary for the entire arrangement that has this material to be cross-linked.

Because the weld seam between the joining part and the polycarbonate part is made first and only after that is the vinyl acetate and polyethylene copolymer cross-linked so that the bond withstands the high sterilization temperatures, the bag is sterilization-proof. However, the radiation cross-linking entails considerable effort and expense, because all of the complete dispenser units have to be brought to a suitable radiation source and treated there.

Also in this prior art, the selection of material for the bag is greatly limited, since a polyolefin that can be welded to the polyolefin-containing EVA always has to be used as the inner material of the bag, because otherwise the connection to the PC part and to the inside of the bag is not assured.

A similar arrangement is known from German Patent Disclosure DE-A 33 05 365. It describes PVC-free sterilizable bags that have an outer layer of polyamide, usually PA 66, adhesive, and a mean-density polyethylene as the inner layer.

These bags are physiologically unobjectionable, since the polyethylene contains no plasticizers and is at least equal in quality PVC bags—except that they are very complicated to manufacture and that the MD polyethylene (medium-density polyethylene) used is expensive.

From European Patent Disclosure EP 380 270, a tubular material for attachment to the patient or for introducing additional material into a flexible bag, which can optionally be welded to a polycarbonate hard part, has been disclosed in the form of a three-layer tubular material which can be sealed on the outside to polycarbonate by means of ultrasound, microwaves, or heat.

This sterilizable tube has an outer layer with polypropylene, ethylene propylene copolymer, or an ethylene propylene copolymer modified with a thermoplastic elastomer, which can be sealed to polycarbonate, while an intermediate layer that makes the joining piece flexible may be a very low-density propylene, ethyl vinyl acetate copolymer, modified or unmodified ethylene methylacrylate copolymer, polyvinylidine chloride, ethyl vinyl acetate and modified ethylene methylacrylate copolymer, a mixture of ethyl vinyl acetate and very low-density propylene, or a modified ethyl vinyl acetate; the inner layer should have the most heat-resistant polymer material possible, such as a copolyester, polypropylene, ethylene propylene copolymer, polyurethane, PVC, or a mixture of a copolyester with ethyl vinyl acetate.

Preferably, a material for the hose is used that has already been cross-linked via chemical cross-linking agents during coextrusion, to improve the temperature resistance (sterilizability) of the welded bond, or that can be radiation cross-linked afterward, since otherwise the material will not maintain its properties under sterilization conditions and will flow away. This known joining part is designed to be joined on the outside to polycarbonate and has a complicated structure—which is the connection with the flexible bag. This is not accordingly a joining part but rather a tube for liquids that is to be connected to the polycarbonate part and that naturally must be autoclavable.

In European Patent Disclosure EP-A 56 42 31, a coextruded joining part for the problem of joining a flexible bag to a polycarbonate hard part is proposed which as its outer layer has a polyolefin polymer material that has a melt flow index of approximately 12.

The inner layer here is bonded to an intermediate layer, which lends flexibility to the joining part and may for instance be SBS, and is embodied as a joining layer containing ethyl vinyl acetate, which is to be secured to the polycarbonate. This arrangement again requires the usual provision of cross-linking the bag after the joining part is welded thereto, for instance by means of radiation, to make the arrangement sterilizable.

From German Patent Disclosure DE 44 27 175 (Coster), it has become known for a flexible bag with a multilayer foil that has as its outer layer a polyamide or polyester layer to improve mechanical strength, with an inner layer of polyethylene or polypropylene, to be welded to a connection tubule that has an outer layer of polyethylene, polypropylene or the like, since polyethylene and polypropylene can be readily welded well only to themselves or to one another. As the hard part, to which the inner layer of the joining part is welded, polyacetal is proposed. However, this arrangement has the disadvantage of not being heat-sterilizable.

International Patent Disclosure WO 93/23108 (Baxter) addresses the problem of a joining part for flexible bags with PVC, which is extruded here in three layers and has as its outer layer a polypropylene copolymer/styrene ethylene-butylene-styrene copolymer mixture and an inner layer of PVC. The use of PVC, however, is usually undesired, for the reasons given above.

SUMMARY OF THE INVENTION

In view of the above, the invention has as its object bonding multilayer bags with a polyolefin inner layer to a hard part; these bags should be sterilizable yet their manufacture should be greatly simplified.

This object is attained by the features of the present invention.

The invention also relates to a process for manufacturing a dispenser unit of one of the foregoing claims, characterized by:
coextrusion of the multilayer bag material;
coextrusion of the multilayer joining part;
sealing of the bag material;
sealing in of the multilayer joining part;
sealing in of the hard part.

The invention also relates to the use of the dispenser unit for dispensing liquids, in particular liquids containing water, for medical or veterinary purposes or for nutritional purposes. It may be advantageous that the coextruded joining part has a polyethylene with a high EVA content as its inner layer and is radiation cross-linked by itself before the sealing-in.

BRIEF DESCRIPTION OF THE DRAWINGS

The invention will now be described in further detail in conjunction with the drawings, but the invention is in no way limited to this description.

DETAILED DESCRIPTION OF THE INVENTION

Figure 1:
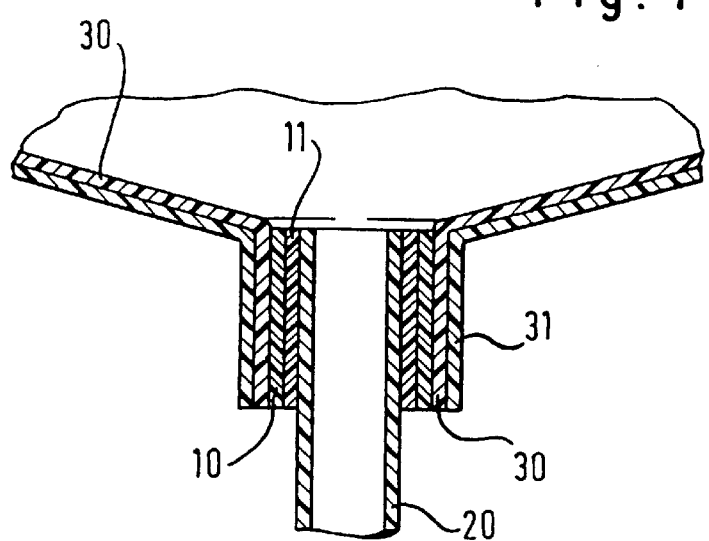
FIG. 1 is a longitudinal sectional view through the bonding region of a joining part, a hard part, and the bag.
Figure 2:
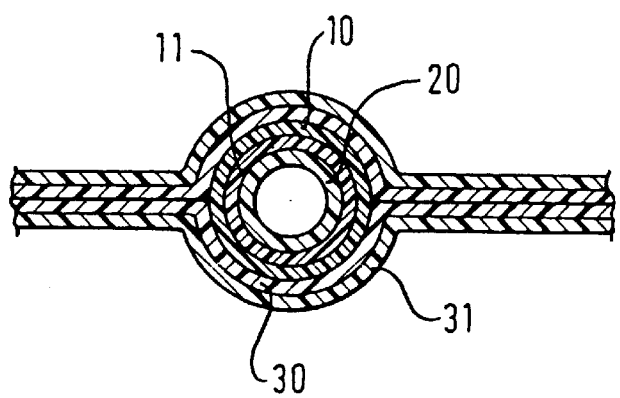
FIG. 2 is a sectional view through the bonding region of FIG. 1.
Figure 3:
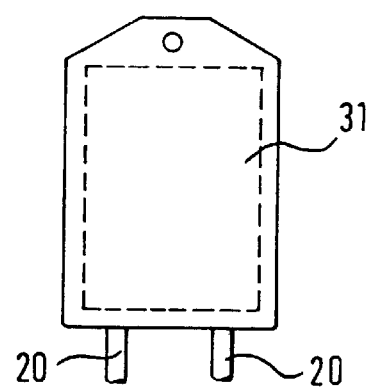
FIG. 3 is a schematic drawing of a complete bag produced according to the invention.

It is appropriate for the hard part to be a polymer, such as polycarbonate, a polyacetal, or polyethylene.

Because now only the inner layer of the joining part needs to be suitable for securing to the hard part, while with polycarbonate that is often used the corresponding joining olefin must usually be cross-linked and in particular radiation cross-linked, it is now possible to subject only the joining parts themselves to the complicated and expensive cross-linking operation, while the bag itself can be produced from inexpensive, relatively thermally stable polyolefins.

It is accordingly no longer necessary for the bags already provided with the joining part and comprising polyethylene with a high EVA content of at least 15 weight % and preferably 15 to 30 weight % as the inner material of the bag and also an outer layer of the joining part, to be transported by road, railway, etc. to the irradiating facility; now only the joining parts must be so transported, which additionally reduces production costs and environmental pollution.

By using the multilayer tubes according to the invention as joining parts, polypropylene, which is favorable and intrinsically has a high melting temperature (140 to 160° C.) can be used as the bag material. As a result, considerably higher sterilization temperatures can be employed; in particular, steam sterilization of the bags is unproblematic, which at the same time can mean that the sterilization times can be shortened.

Multilayer bags of polypropylene, of the kind known particularly from U.S. patent application Ser. No. 09/142, 925, deposited Sep. 18, 1998, are especially preferred, and the disclosure of U.S. patent application Ser. No. 09/142,925 is hereby fully incorporated by reference herein.

Steam sterilization does not cause the inside faces to stick together; only thereby safe heat sterilization is possible.

Formerly, when polyethylene or PVC was used, it had to be roughened to prevent the inside faces from sticking together when the inner layer of the bag was PVC or polyethylene; because of the embodiment according to the invention, which now uses higher-melting plastics that need not be bonded to polycarbonate, the processing steps of roughening can now be avoided, and furthermore the bag has even better transparency.

It may be necessary to integrate an additional barrier layer into the bag foil. As the barrier layer, ethylene vinyl alcohol (EVOH) can thus be used, which seals very well against oxygen, nitrogen, $CO_2$, and other gases.

It is also possible by thin-film technology to coat a further layer (such as polyethylene) with SiOx or aluminum oxide. It is also naturally possible, as described in the prior art, to use laminated polyamide/polyethylene foils as bags, as before—but because of the selection of joining parts according to the invention in combination with the other materials, it is also possible then to dispense with radiation cross-linking of the complete bags.

It may be favorable for the flexible bag to have PVC, polyethylene, polypropylene, polyamide and their compounds, in particular those with thermoplastic elastomers, such as SEBS compounds thereof or multilayer laminated foils thereof, such as polyethylene/ethyl vinyl acetate, PA/polyethylene, polypropylene/SEBS, etc. It is advantageous if the bag is produced by coextrusion, for instance; however, all the production processes familiar to one skilled in the art may be employed.

It is favorable that the joining part has an inner layer that forms a heat-sterilizable connection with polycarbonate, such as cross-linked polyethylene with a high ethyl vinyl acetate content, or also PVC, which as an inner layer has practically no contact with the material or liquid in the bag and therefore at this location, since it is used only as bonding material, is relatively unproblematic.

A dispenser unit according to the invention can be manufactured in such a way that in a manner known per se a sterile polymer bag is produced, for instance by coextrusion in the case of a multilayer bag, or the like, while independently thereof a multilayer polymer joining part in the form of a tube is produced—for instance by coextrusion—the outer material of which is weldable to the inner material of the bag and whose inner layer is weldable to the outer material of the hard part; this joining part can optionally be radiation cross-linked in order to make it sterilization-proof; a hard part is produced of a material that can be welded to the inner material of the joining part, and the hard part is then welded to the joining part which is welded to the bag interior, creating a welded bond that withstands high temperatures, such as the usual sterilization temperatures.

Such dispenser units are especially suitable for storing medical liquids, such as dialysis fluids, solutions for artificial feeding, blood, plasma, and so forth.

Because the combination according to the invention of the bag, joining part and hard part is now employed, is it possible in a special case of sterilizable dispenser units with a hard part to avoid the complicated and expensive cross-linking of the entire bag by radiation, so as to make the polyolefin used for attachment to the hard part resistant to sterilization temperatures; instead, it suffices to cross-link the joining part, because only that part has the cross-linked polyethylene layer, with a high ethyl vinyl acetate content, that is needed for secure attachment to the polycarbonate.

It is also possible, for the multilayer film bags, to avoid using films with polyamide/polyethylene with special, expensive MD polyethylene, which just barely withstands the sterilization temperature of 121° C.; instead, it is now possible according to the invention to use a simpler less expensive, and more heat-resistant polyolefin as the outer layer of the joining part and as the inner layer of the bag.

The flexible bag preferably has PVC, polyethylene, polypropylene, polyamide and compounds thereof or multilayer laminated foils thereof, such as polyethylene/ethyl vinyl acetate and polyamide/polyethylene.

The multilayer polymer tube of the joining part may for instance have an outer layer comprising polyethylene or PVC; the multilayer polymer tube and the flexible bag are welded to one another.

As can be seen in FIG. 1, a preferred embodiment of a dispenser unit according to the invention has a bag of multilayer film, which as its inner layer has sealable polyolefin that forms sealed seams that are tight at sterilization temperatures, such a polypropylene or polyethylene, a polypropylene compound, or the like.

The joining part, which is embodied here as a two-layer polymer tube, has as its outer material 10 a polyolefin that is weldable to the inner layer material 30 of the bag, such as polypropylene or polyethylene, a polypropylene compound, or the like, and is welded to the inner layer 30 of the bag foil.

As the inner layer 11, the joining part has a polyethylene copolymer compounded with a high ethyl vinyl acetate content, which after radiation cross-linking to a polycarbonate part 20 is weldable in such a way that it forms a sterilization-proof, liquid-proof weld seam and retains its flexibility and elasticity even after sterilization.

The polycarbonate tube is now welded into the already radiation cross-linked joining part.

EXAMPLES

Example 1

Two-layer tubes with a diameter of 8 mm, with an outer layer of a polyethylene, compounded with KRATON in a thickness of 0.45 mm, and an inner layer of polyethylene with a high ethyl vinyl acetate content in a thickness of 0.5 mm, are coextruded in a manner known per se as joining parts. Thus tube material is then cross-linked by radiation, thus lending the inner layer material an adequate temperature resistance of over approximately 160° C.

Coextruded two-layer bags with an outer layer of polypropylene and an inner layer of polypropylene compounded with the same thermal plastic elastomer as in the outer layer of the joining part, are then joined to the cross-linked joining tube by means of high-frequency welding. Next, a polycarbonate hard part with a tube attachment is inserted in a manner known per se into the joining part and then welded to it. The cross-linked polyethylene with a high ethyl vinyl acetate content thus forms a tight sealing seam that is durable under the thermal conditions of steam sterilization.

Example 2

Two-layer tubes with an outer diameter of 6 mm, an outer layer of polyethylene in a thickness of approximately 0.5 mm, and an inner layer of polyethylene with a high ethyl vinyl acetate content approximately 0.5 mm thick, are coextruded in a manner known per se. This tube material is then radiation cross-linked, thus lending the inner layer material adequate temperature resistance of its properties of over approximately 160° C.

Coextruded two-layer bags with an outer layer of polyethylene and an inner layer of polyethylene compounded with an elastomer are then bonded by high-frequency welding to the cross-linked joining tube, which on the outside has compounded polyethylene and on the inside has the cross-linked polypropylene with the high ethyl vinyl acetate content. The polycarbonate part is then inserted and sealed in a manner known per se.

Example 3

Two-layer tubes with an outer diameter of 8 mm and an inner diameter of approximately 6 mm, with an outer layer of an ethyl vinyl acetate polypropylene 0.45 mm thick and an inner layer of polyethylene with an ethyl vinyl acetate content of 23 weight % 0.5 mm thick are coextruded in a manner known per se. This tube material is then radiation cross-linked, thereby lending inner layer material adequate temperature resistance of over approximately 160° C.

Coextruded three-layer bags, with an outer layer of polypropylene 200μ thick, an intermediate layer, 200μ thick, of polypropylene compounded with a thermoplastic elastomer (CAWITON, obtainable from the Wittenburg company in Bissum, the Netherlands) and an inner layer, approximately 250μ thick, of polypropylene compounded with a relatively higher proportion of thermoplastic elastomer (CAWITON), which have been made by extrusion into a water bath, are then joined by high-frequency welding to the cross-linked joining tube, which on its outside has a polypropylene compounded with a thermoplastic elastomer (CAWITON) and on its inside has a cross-linked polyethylene with a high ethyl vinyl acetate content. The polycarbonate part is then inserted and sealed in a manner known per se. Dialysis solutions, for instance for continuous ambulatory peritoneal dialysis or CAPD, can be placed in this bag and steam-sterilized and stored in the bag.

Although the invention has been described in terms of preferred exemplary embodiments, it is no way limited to them or to the embodiments shown. An arbitrary number of further embodiments that come under the protective scope of the claims are within the competence of one skilled in the art.

What is claimed is:

1. A dispenser unit for dispensing a liquid comprising
a flexible polymer bag having an inner surface, the flexible polymer bag being made from at least one polymer selected from the group consisting of PVC, polyethylene, polypropylene and polyamide,
an inflexible hard part which comprises a polymer, and
a joining part having an inner layer welded to the inflexible hard part and an outer layer welded in a heat-sterilizable fashion to the inner surface of the flexible polymer bag, the outer layer of the joining part and the inner surface of the flexible polymer bag both comprising at least partially identical polymers.

2. The dispenser unit of claim 1, wherein the flexible polymer bag is made from said at least one polymer and a thermoplastic elastomer.

3. The dispenser unit of claim 2, wherein the thermoplastic elastomer is SEBS.

4. The dispenser unit of claim 2, wherein the flexible polymer bag is made of a multilayer laminated foil selected from the group consisting of polyethylene/ethyl vinyl acetate, polyamide/polyethylene and polypropylene/SEBS.

5. The dispenser unit of claim 1, wherein the inflexible hard part is a polymer selected from the group consisting of polycarbonate, polyethylene and polyacetal.

6. The dispenser unit of claim 5, wherein the inner layer of the joining part comprises a copolymer comprising a cross-linked polyethylene having an ethylene vinyl acetate content of 15 to 30 weight %.

7. The dispenser unit of claim 1, wherein the inner layer of the joining part comprises PVC.

8. The dispenser unit of claim 1, wherein the flexible polymer bag has an outer surface of polypropylene and an inner surface of polypropylene compounded with a thermoplastic elastomer; the outer layer of the joining part comprises polypropylene compounded with said thermoplastic elastomer; the inner layer of the joining part comprises a copolymer comprising a radiation cross-linked polyethylene having an ethyl vinyl acetate content of 15 to 30 wt. % or PVC; and the inflexible hard part comprises polycarbonate.

9. The dispenser unit of claim 8, wherein said thermoplastic elastomer is SEBS.

10. A dispenser unit for dispensing a liquid comprising
a flexible polymer bag having an inner surface, the flexible polymer bag being made from at least one polymer selected from the group consisting of PVC, polyethylene, polypropylene and polyamide,
an inflexible hard part which comprises a polymer, and
a joining part having an inner layer welded to the inflexible hard part and an outer layer welded in a heat-sterilizable fashion to the inner surface of the flexible polymer bag, the outer layer of the joining part and the inner surface of the flexible polymer bag both comprising the same polymer selected from the group consisting of PVC, polyethylene, polypropylene and polyamide.

11. The dispenser unit of claim 10, wherein said same polymer comprises polypropylene compounded with a thermoplastic elastomer.

12. The dispenser unit of claim 10, wherein the flexible polymer bag has an outer surface of polypropylene and an inner surface of polypropylene compounded with a thermoplastic elastomer; the outer layer of the joining part comprises polypropylene compounded with said thermoplastic elastomer; the inner layer of the joining part comprises a copolymer comprising a radiation cross-linked polyethylene having an ethyl vinyl acetate content of 15 to 30 weight % or PVC; and the inflexible hard part comprises polycarbonate.

13. The dispenser unit of claim 12, wherein said thermoplastic elastomer is SEBS.

14. A process for producing a dispenser unit for dispensing a liquid according to claim 1, comprising
(a) coextruding a multilayer bag material,
(b) coextruding a multilayer joining part,
(c) sealing of the multilayer bag material,
(d) sealing of the multilayer joining part and
(e) sealing of the hard part.

15. The process of claim 14, wherein the multilayer joining part has an inner layer of a polyethylene having an ethyl vinyl acetate content of 15 to 30 weight % and is radiation cross-linked before it is sealed in.

16. A method for dispensing a liquid comprising disposing a liquid in the dispenser unit according to claim 1.

17. The method of claim 16, wherein the liquid is selected from the group consisting of water, a liquid used for medical purposes, a liquid used for veterinary purposes and a liquid used for nutritional purposes.

\* \* \* \* \*